MAGNETIC FLIP-FLOP

Filed April 25, 1955 2 Sheets-Sheet 1

WILLIAM R. ARSENAULT,
ALLEN E. GARFEIN,
INVENTORS

BY Ellsworth R. Roston
ATTORNEY

MAGNETIC FLIP-FLOP

Filed April 25, 1955 2 Sheets-Sheet 2

WILLIAM R. ARSENAULT,
ALLEN E. GARFEIN,
INVENTORS

BY
Ellsworth R. Roston
ATTORNEY

United States Patent Office 2,802,953

Patented Aug. 13, 1957

2,802,953

MAGNETIC FLIP-FLOP

William R. Arsenault, Santa Monica, and Allen E. Garfein, Culver City, Calif., assignors to The Magnavox Company, Los Angeles, Calif., a corporation of Delaware

Application April 25, 1955, Serial No. 503,410

12 Claims. (Cl. 307—88)

This invention relates to flip-flops and more particularly to a flip-flop which uses a pair of magnetic memory members to produce signals from one of the members in representation of a first value and signals from the other memory member in representation of a second value.

Considerable progress has been made in recent years in developing digital computers and data processing systems. In view of this progress, it now appears that computers and data processing systems can be used in a wide variety of ways to make the operation of offices and production lines almost automatic. In digital computation, complex numbers are represented in binary form by pluralities of signals. Each signal has a first amplitude to represent an indication such as "0" and a second amplitude to represent an indication such as "1." For example, a decimal number of "83" can be represented in binary form by a plurality of signals having a configuration of 1100101, where the least significant digit is at the left.

Some of the digital computers being built are of great size and complexity of operation. Even though the computers are relatively large and complex, all computers are built from a relatively small number of basic components. Perhaps the most basic component is the flip-flop. In general, a flip-flop has two states of operation, one state of operation to represent indications of "0" and the other to represent indications of "1." The operation of the flip-flop is controlled by triggering signals introduced to the flip-flop.

One of the reasons for the relatively large size of the digital computers now in use is the relative complexity of the flip-flops. The flip-flops require at least two vacuum tubes to produce a bistable operation and also require additional vacuum tubes in the input and output stages of the flip-flops. Vacuum tubes occupy a large space and also have unstable characteristics during their life span, which is relatively short. The characteristics of the vacuum tubes also vary considerably between different tubes of the same model.

Another disadvantage of the flip-flops now in use is that they require diodes to obtain a proper bistable operation and to pass this bistable operation to successive stages. The number of diodes required for each flip-flop is relatively large. Each diode in itself is relatively small and the power consumed by each diode is somewhat limited. However, the total space occupied by the diodes and the total consumption of power by the diodes can become relatively large in view of the considerable number of diodes in a flip-flop package. The diodes also tend to destroy optimum wave shapes from one stage to the next.

This invention provides a flip-flop which overcomes the above disadvantages by utilizing a pair of magnetic memory members to eliminate any necessity for vacuum tubes and diodes. Each memory member is formed from a saturable magnetic core such as a toroidal core having a pair of holes which interrupt the magnetic continuity of the core. Each core includes a first winding disposed on the core at a position between the pair of holes in the core. The winding is adapted to receive a current for producing a saturating flux in the core. Each core also includes a second winding. This winding threads one of the holes in its associated core and receives a signal for reducing the saturating flux in the core to a neutral level.

Third and fourth windings are magnetically coupled to each core and are disposed in threading relationship to the second hole in their associated core. The third winding in each core receives clock signals at periodic intervals and produces transient flux in the core at such times as the flux of reduced intensity has been produced in the core by the second winding. The fourth winding has electrical signals induced in it in accordance with the transient flux produced in the core by the clock signals in the third winding.

The first winding in one of the cores and the second winding in the other core are connected to a first signal source. Similarly, the second winding in the first core and the first winding in the second core are connected to a second signal source. By such cross-connections, only one of the cores is able to be saturated at any time and the other core is provided with flux of a neutral intensity. The saturated core is not able to produce output signals upon the introduction of clock signals to the third winding. However, the unsaturated core is able to induce output signals in its fourth winding when clock signals are introduced to its third winding. In this way, the signals from the first source control the production of output signals from the second core and the signals from the second source control the production of output signals from the first core.

An object of this invention is to provide a flip-flop which utilizes magnetic techniques to produce output signals at either a first terminal or a second terminal on a bistable basis.

Another object is to provide a flip-flop of the above character which utilizes a pair of memory members each having characteristics to retain magnetic information even while output signals are being produced.

A further object is to provide a flip-flop of the above character in which each of the two memory members in the flip-flop are modified by holes such that a saturating or neutral flux can be permanently retained in each core to control the production of output signals.

A still further object is to provide a flip-flop of the above character requiring no vacuum tubes or diodes for the proper operation of the flip-flop, such vacuum tubes or diodes not even being required in the input and output stages of the flip-flop.

Still another object is to provide a magnetic flip-flop of the above character which is inexpensive, compact, reliable and long-lived and which requires a minimum number of components.

Other objects and advantages will be apparent from a detailed description of the invention and from the appended drawings and claims.

Figure 1:
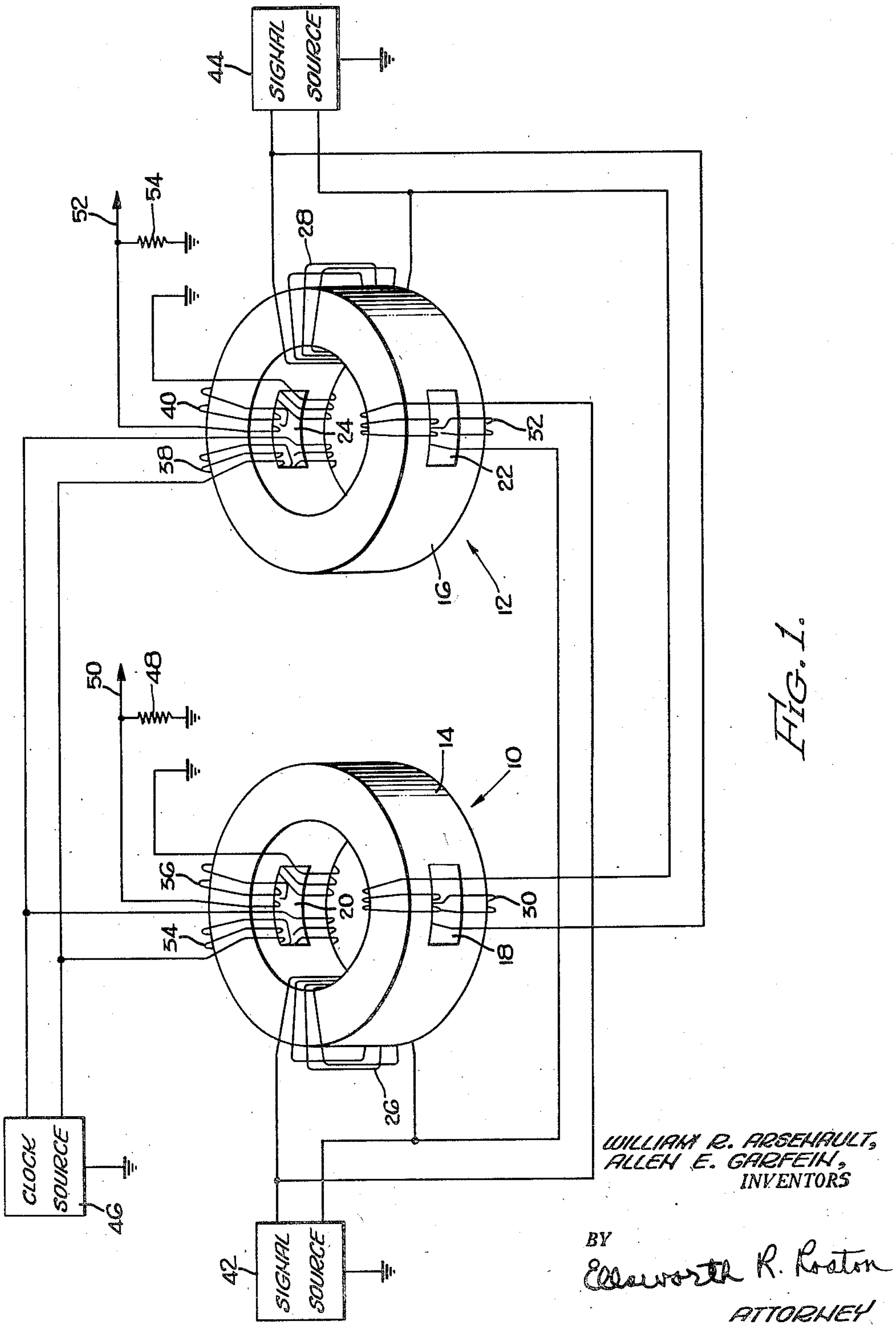
Figure 1 is a view, partly in perspective and partly in block form, of a magnetic flip-flop constituting one embodiment of this invention.
Figure 2:
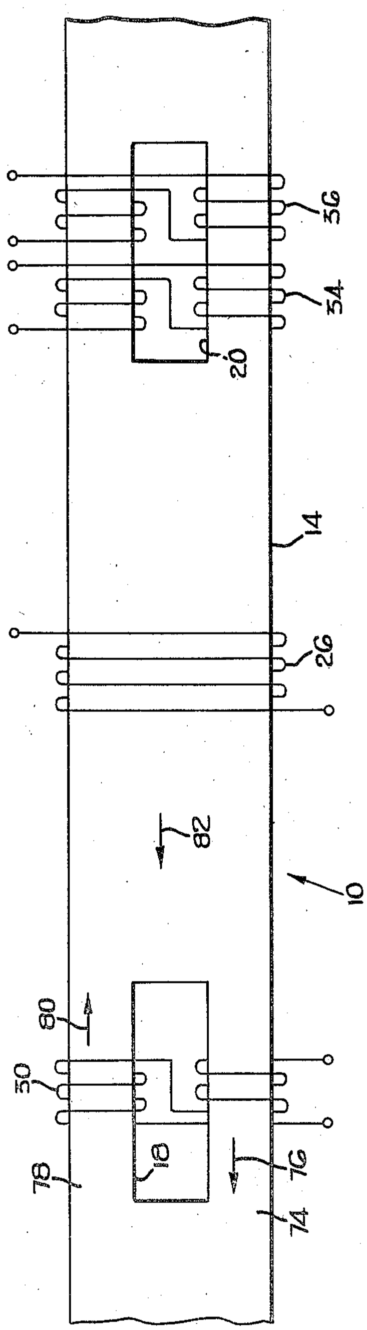
Figure 2 is an enlarged, fragmentary, front-elevational view of one of the magnetic members shown in Figure 1 and illustrates the appearance of the memory member as if the member were broken along a radial line and stretched into a planar disposition.

In the embodiment of the invention shown in Figures 1 and 2, a pair of memory members generally indicated at 10 and 12 are included as major components in a flip-flop. The memory members 10 and 12 respectively include magnetic cores 14 and 16. Each of the cores 14 and 16 may be a toroidal core made from a suitable material having saturable magnetic properties. For example, the cores 14 and 16 may be made from a ferrite material designated as S1, S2 or S3 by the General Ceramic and Steatite Corporation of Keasbey, New Jersey. This material is a ferromagnetic ceramic molded from powdered particles.

The outer and inner diameters of the toroidal cores 14 and 16 may be approximately 0.37 and 0.18 inches respectively, and the thickness of the cores may be approximately 0.12 inches. Holes 18 and 20 having suitable heights such as approximately 0.04 inches are provided in the core 14 in either a radial or axial direction. As shown in the drawings, the holes are provided in a radial direction. Corresponding holes 22 and 24 are provided in the core 16.

In an axial direction, the centers of the holes 18, 20, 22 and 24 may be equally spaced from the upper and lower extremities of the associated core as seen in Figures 1 and 2. The holes 18, 20, 22 and 24 may be circular or they may be elongated to a suitable length such as 0.10 inches in a manner similar to that shown in Figures 1 and 2. It should be appreciated, however, that the dimensions described above for the holes 18, 20, 22 and 24 are given only for purposes of illustration.

A first current conductor such as a winding 26 is disposed in magnetic proximity to the core 14 at a position between the holes 18 and 20. Similarly, a first current conductor such as a winding 28 is magnetically coupled to the core 16 at a position betwen the holes 22 and 24. The windings 26 and 28 may be formed from one or more turns wrapped around their associated cores. The windings 26 and 28 are provided with a sufficient number of ampere-turns to saturate their associated cores with magnetic flux.

Second current conductors such as windings 30 and 32 are respectively disposed in magnetic proximity to the cores 14 and 16 and in threading relationship to the holes 18 and 22. The windings 30 and 32 may be formed from a single wire threading their associated holes or from one or more turns. When formed from one or more turns, the windings 30 and 32 are preferably disposed in a symmetrical arrangement relative to their associated cores. For example, when the winding 30 is formed from more than one turn, half of the turns extend through the hole 18 in the core 14 and loop over the upper extremity of the core as seen in Figures 1 and 2. The other half of the turns forming the winding 30 extend through the hole 18 and loop around the lower extremity of the core 14. In this way, the winding 30 is disposed in a symmetrical relationship with respect to the upper and lower extremities of the core 14.

Each of the cores 14 and 16 is magnetically coupled to a pair of current conductors disposed in threaded relationship to the second hole in the core. For example, current conductors such as windings 34 and 36 thread the hole 20 in the core 14 and current conductors such as windings 38 and 40 thread the hole 24 in the core 16. Each of the windings 34, 36, 38 and 40 may be formed by a single wire threading the associated hole or from one or more turns, all of which extend through the proper hole in the associated core. The turns forming each winding are preferably disposed in a symmetrical arrangement with respect to the hole which the winding threads. As an example, when the winding 34 is formed from more than one turn, the turns are preferably disposed in a symmetrical arrangement relative to the hole 20 such that half of the turns loop the upper extremity of the core and the other half loop the lower extremity of the core. The windings 34, 36, 38 and 40 are shown in Figures 1 and 2 as having such a symmetrical relationship.

The memory members 10 and 12 are included in the circuit shown in Figure 1. This circuit also includes a pair of signal sources 42 and 44. The sources 42 and 44 may be included in a digital computer or data processing system and are adapted to provide signals at certain times during the operation of the computer or data processing system. The source 42 is connected to the current conductor 26 associated with the core 14 and to the current conductor 32 associated with the core 16. The source 42 is adapted to provide a voltage of sufficiently high intensity to saturate the core 14, as will be described in detail hereinafter. The voltage from the source 42 is also of sufficient intensity such that the winding 32 will produce a flux for neutralizing any residual flux of saturating intensity previously existing in the core 16. The source 44 is adapted to produce signals of substantially the same intensity as the source 42. The source 44 is connected to the winding 28 associated with the core 16 and to the winding 30 associated with the core 14. The signal from the source 44 is adapted to produce a saturating flux in the core 16 and a flux of neutral intensity in the core 14.

The windings 34 and 38 are connected to a source 46 of clock signals. The source 46 may be a relaxation oscillator adapted to provide signals at a particular frequency. The clock signals may also be produced internally at regular intervals in a computer or data processing system such as from the rotation of a magnetic drum. One terminal of the winding 36 is grounded. The other terminal of the winding 36 is connected to one terminal of a resistance 48 having its other terminal grounded. An output line 50 extends from the ungrounded terminal of the resistance 48. Similarly, one terminal of the current conductor 40 is grounded and the other terminal is provided with a common connection to an output line 52 and to one terminal of a resistance 54. The other terminal of the resistance 54 is grounded.

As will be seen, the construction and operating characteristics of the memory member 12 are similar to those of the member 10. For this reason, by describing the operating characteristics of the memory member 10, the operating characteristics of the member 12 should be easily understood. Because of the particular material from which the core 14 in the memory member 10 is made, the core has substantially a rectangular hysteresis loop similar to that shown in Figure 3. In the curve shown in Figure 3, the ampere-turns applied to the core are represented along the horizontal axis and the flux produced in the core by the ampere-turns is represented along the vertical axis.

Figure 3:
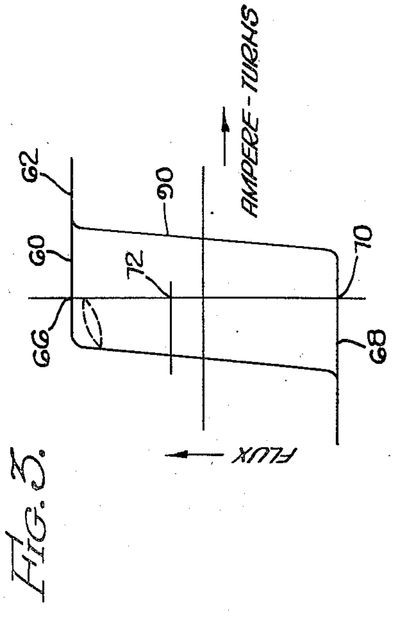
Figure 3 is a curve illustrating certain magnetic characteristics of each of the magnetic members shown in the previous figures.

As indicated at 60 in Figure 3, the core 14 becomes saturated with magnetic flux of a positive polarity when a sufficient number of positive ampere-turns are applied to the winding 26. When the core 14 becomes saturated, increases in the ampere-turns applied to the winding 26 produce no appreciable increase in the amount of flux traveling through the core. This is indicated at 62 in Figure 3. Upon the interruption of the current flowing through the winding 26, a residual flux remains in the core 14. This residual flux is of a sufficient intensity to saturate the core 14, as indicated by a position 66 corresponding to a zero value of ampere-turns in the winding 26.

In like manner, the core 14 would become saturated with a flux of negative polarity as indicated at 68 when a sufficient amount of ampere-turns of negative polarity would be applied to the core. Substantially all of the flux would remain in the core 14 as residual flux upon an interruption in the ampere-turns applied to the core. The residual flux of negative polarity is indicated at 70 in Figure 3.

Since the core 14 has the properties of retaining a considerable amount of magnetic flux after the application of ampere-turns to the core, the magnetic member formed by the core and the windings on the core is able to serve as a memory. The magnetic member 10 is able to serve as a memory because it stores magnetic information in the core corresponding to the signals applied to the windings 26 and 30. The remanent flux produced by the flow of current through the winding 26 represents first particular information and the remanent flux produced by the flow of current through the winding 30 represents second particular information. For example, the flux remaining in the core 14 after the flow of current through the winding 26 may represent a "true" state and the flux remaining in the core 14 after the flow of current through the winding 30 may represent a "false" state.

In copending application Serial No. 473,664, the function of a winding corresponding to the winding 30 is disclosed. As described in the copending application, the winding 30 produces magnetic flux which opposes the residual magnetic flux resulting from the flow of current through the winding 26. When current flows through the winding 30, it causes the residual flux in the core 14 to decrease from a saturating intensity 66 to a relatively neutral intensity such as that indicated at 72 in Figure 3. The residual flux decreases only from the saturating intensity 66 to the neutral level 72 even though currents of very large intensity are applied to the winding 30. Only a neutral level of residual flux is produced even though a corresponding amount of negative ampere-turns applied to the winding 26 would produce a flux saturation such as that indicated at 70 in Figure 3.

The production of a neutral flux upon the flow of current through the winding 30 may be seen from the following discussion. When current flows through the winding 30, it produces a magnetic field in a leg 74 as indicated by an arrow 76 in Figure 2 and a magnetic field in a leg 78 as indicated by an arrow 80. The field 76 is in the same direction as the residual flux in the core 14 when the residual flux has a positive polarity and a magnitude indicated at 66 in Figure 3. This residual flux is indicated by an arrow 82 in Figure 2. The residual flux 82 flows through the legs 74 and 78 and saturates each of the legs. As will be seen, the field 80 is in an opposite direction to the residual flux 82.

Since the field 76 is in the same direction as the residual flux 82, it will have little effect because of the saturation already produced by the flux 82. However, the field 80 is capable of considerably influencing the core 14 because of its action in opposing the flux 82. The result of this asymmetric effect is to produce a net magnetic field around the core 10 in a direction opposing the residual flux 82. This opposing field acts to reduce the flux in the core 14 from the saturating intensity indicated at 66 in Figure 3.

If the flux 82 could be reduced from the saturating intensity 66 to a zero intensity, the leg 74 would necessarily be saturated in a direction indicated at 76 and the leg 78 would be saturated in a direction indicated at 80 when a relatively large current was made to flow through the winding 30. Under this neutral condition, the effects of the fields 76 and 80 would be equal and there would be no net field around the core 14. However, the residual flux 82 travels completely through the core 14 instead of the area just around the hole 18. This residual flux 82 acts in combination with the field represented at 76 to somewhat overbalance the effects of the field represented at 80. Because of this, the residual flux 82 is reduced from the saturating intensity 66 to the neutral intensity 72 instead of being reduced to a value of "0." For the reasons described above, the flux of neutral level 72 traversing the core 14 is of the same polarity as the saturating intensity 66.

When a signal is produced by the source 42, it causes current to flow through the winding 26 associated with the core 14 and the winding 32 associated with the core 16. The current flowing through the winding 26 produces a residual flux of saturating intensity 66 in the core 14. However, the current flowing through the winding 32 produces a flux of residual intensity 72 in the core 16 as described above.

Figure 4:
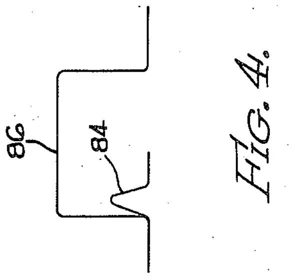
Figure 4 shows a pair of curves which illustrate the signals produced by each magnetic member when saturating or neutral flux is produced in the member.

Upon the subsequent introduction of a clock signal from the source 46 to the windings 34 and 38, current flows through the windings. The currents flowing through the windings 34 and 38 ordinarily would produce magnetic fluxes in the cores 14 and 16 since the cores are magnetically coupled to the windings. However, since a flux having the saturating intensity 66 already exists in the core 14, very little flux can be produced in the core 14 by the current flowing through the winding 34. Since no flux or relatively little flux is produced in the core 14 upon the occurrence of the clock signals, the flux produced by the flow of current through the winding 26 acts as an inhibiting agent. Because of the failure to produce any appreciable amount of flux in the core 14, no electrical signal is induced in the winding 36 or at the most only a signal of relatively low intensity is induced in the winding. In Figure 4, a signal 84 of relatively low amplitude and short duration is shown as being induced in the winding 36 when the residual flux in the core 14 is at the saturating intensity 66.

Since a magnetic flux of neutral intensity 72 exists in the core 16, the current flowing through the winding 38 from the clock source 46 is able to produce additional flux in the core. The flux produced in the core by the flow of current through the winding 38 is of a transient nature and is localized around the hole 24 for reasons described above. Because of the disposition of the winding 40 in threaded relationship to the hole 24, the localized transient flux produced by the flow of current through the winding 38 threads the winding 40 and causes a voltage to be induced in the winding.

The voltage induced in the winding 40 by the flow of current through the winding 38 is indicated at 86 in Figure 4. As will be seen, both the amplitude and duration of the signal 86 are greater than those of the signal 84. This results from the fact that a considerable amount of localized flux is produced by the flow of current through the winding 38 even though this current has a relatively low amplitude. A considerable amount of localized transient flux is produced with a small amount of current because the core 16 is operating in the steep portion of the hysteresis curve, as illustrated at 90 in Figure 3. The signal 86 induced in the winding 40 causes a relatively large current to flow through the resistance 54 and a signal of relatively large amplitude to be developed across the resistance. This signal appears on the output line 52.

Successive signals from the clock source 46 have no appreciable effect on the residual flux 66 of saturating intensity in the core 14. Since the residual flux in the core 14 remains at or near a saturating intensity, no further transient flux of appreciable magnitude is produced by the flow of current through the winding 34. This prevents any appreciable signal from being induced in the output winding 36. However, each signal from the source 46 causes a transient flux to be produced in the core 16 by the flow of current through the winding 38. This flux is localized around the hole 24 and links the turns of the winding 40 to induce an output voltage in the winding. This voltage appears across the resistance 54 and on the output line 52.

When a signal is produced in the source 44, it causes current to flow through the winding 28. This current produces a flux of saturating intensity in the core 16. Because of this, a residual flux of saturating intensity remains in the core 16 at the end of the signal from the source 44. Since the core 16 is saturated, the current flowing through the winding 38 upon the occurrence of clock signals from the source 46 is not able to produce any appreciable amount of transient flux. This prevents any appreciable voltage from being induced in the winding 40 and any signals of significant amplitude from being developed across the resistance 54 upon the occurrence of the clock signals in the source 46.

The signal from the source 44 also causes current to flow through the winding 30 magnetically associated with the core 14. This current produces flux which acts on the residual flux in the core to reduce the residual flux to a neutral intensity such as that indicated at 72 in Figure 3. Since the residual flux is reduced to a neutral level, the current produced in the winding 34 by the clock signals from the source 46 is able to produce transient variations of a localized nature in the flux around the hole 20. These transient variations in the flux link the winding 36 and cause signals to be induced in the winding. The signals induced in the winding 36 cause corresponding voltages to be produced across the resistance 48 and to appear on the output line 50.

In this way, a flip-flop is produced in which a pair of magnetic memory members having non-destructive characteristics are utilized to produce binary output information. Only the core in one of the memory members can become saturated at any time and the core in the other memory member is at a neutral level of flux at this time. The memory member having the saturated core cannot produce output signals. However, the memory member having the unsaturated core is able to produce an output signal upon each occurrence of a clock signal. The cores are able to operate in this fashion over a large number of successive clock signals and until the polarity of the magnetic information in the cores is inverted.

The flip-flop described above has several important advantages. It utilizes only magnetic techniques to obtain output signals on a binary basis. By using only magnetic techniques, any previously existing requirement for vacuum tubes or diodes is eliminated. This is advantageous since vacuum tubes and diodes require power for proper operation and use up unnecessarily large amounts of valuable space. Vacuum tubes also have unstable operating characteristics, short lives and unpredictable parameters from tube to tube of the same model.

By utilizing only magnetic techniques, the number of components required for proper operation of the flip-flop is minimized. Essentially, only a pair of non-destructive magnetic memory members is required. The feature of non-destructibility of the magnetic information in each memory member is important since it does not require recirculation of magnetic information in the memory member every time that the information is sampled by a clock signal to produce an output signal. Since the magnetic information is retained without any material destruction, sequences of signals all representing indications of "1" or a "true" state can be produced at one output terminal upon the introduction of successive clock signals. Similarly, sequences of signals representing indications of "0" or a "false" state can be produced at a second output terminal upon the introduction of successive clock signals. The signals can be produced at a relatively high frequency since no time is required to recirculate the magnetic information in the memory members after the production of each output signal.

The above advantages are obtained merely by providing a pair of holes in the core forming a part of each memory member and by threading windings through the holes in each core. The cores can be purchased as standard items and the holes can be easily produced in the cores without requiring that the cores be subsequently heat treated. Since the necessary windings can be easily disposed in magnetic proximity to the cores, relatively simple and inexpensive memory members are obtained.

It should be appreciated that the holes in each core may be either radial holes as shown in the drawings or they may be axial holes. As described in copending application Serial No. 473,664 filed by William R. Arsenault et al. on December 7, 1954, axial holes have the same effect as radial holes from the standpoint of controlling the operation of non-destructive memory members.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination, a pair of saturable magnetic cores, means magnetically coupled to the cores for intercoupling the cores to produce a saturating level of magnetic flux in either core at the same time as a neutral level of magnetic flux in the other core, means magnetically coupled to the cores for receiving clock signals and for producing transient magnetic fluxes in the cores upon the occurrence of a neutral level of magnetic flux in the cores, and means magnetically coupled to the cores to produce output signals upon the formation of transient magnetic fluxes in the cores, the cores being formed to retain the magnetic information represented by the levels of magnetic flux in the cores even during the introduction of the clock signals.

2. In combination, a pair of saturable magnetic cores, means including first holes in the cores and windings magnetically associated with the cores for electrically intercoupling the cores to produce a residual flux of saturating intensity in either of the cores and to simultaneously reduce any flux in the other core to a neutral level, means including second holes in the cores and windings magnetically associated with the cores for producing in the cores transient magnetic fluxes localized around the holes upon the occurrence of clock signals and during the existence of any flux of neutral intensity in the cores, and means including the second holes in the cores and windings magnetically associated with the cores for producing output signals upon the formation of the localized transient magnetic fluxes.

3. In combination, a pair of saturable magnetic cores, means included in each core for providing the core with characteristics for retaining residual flux levels in the core even upon the production of transient magnetic fluxes in the core, means including a plurality of windings magnetically coupled to each core to produce a first level of magnetic flux in the core for inhibiting the formation of any transient magnetic flux in the core and to produce a second level of magnetic flux for obtaining the formation of transient flux in the core, means including windings magnetically coupled to the cores for obtaining the production of transient flux in the cores at different intervals during the occurrence of the second flux level in the cores, means including windings magnetically coupled to the cores for producing output signals in accordance with the production of transient magnetic fluxes in the cores, and means for electrically intercoupling the windings on the cores to obtain the production of the first level of magnetic flux in either core at the same time as the production of the second level of magnetic flux in the other core.

4. In combination, a first saturable magnetic core, first means magnetically coupled to the core for receiving a sequence of clock signals and for producing a transient magnetic flux in the core upon the occurrence of the clock signals, second means magnetically coupled to the core for the induction of output signals upon the production of the transient magnetic flux, third means magnetically coupled to the core to produce a magnetic flux of saturating intensity in the core for inhibiting the production of transient magnetic flux in the core upon the occurrence of the clock signals, fourth means magnetically coupled to the core to produce a magnetic flux of a reduced intensity in the core for obtaining the production of transient magnetic flux in the core upon the occurrence of the clock signals, a second saturable magnetic core, first, second, third and fourth means magnetically coupled to the second core for operation in a manner similar to the first, second, third and fourth means magnetically coupled to the first core, means electrically coupling the third means associated with the first core and the fourth means associated with the second core to obtain the simultaneous production of a flux of reduced intensity in the second core and a flux of saturating intensity in the first core, and means electrically coupling the fourth means associated with the first core and the third means associated with the second core to obtain the simultaneous production of a magnetic flux of reduced intensity in the first core and a magnetic flux of saturating intensity in the second core.

5. In combination, a first saturable magnetic core, at least a first current conductor disposed in magnetic proximity to the core to produce transient magnetic fluxes in the core upon the introduction of clock signals, at least a second current conductor disposed in magnetic proximity to the core for the induction of output signals upon the formation of transient fluxes in the core, at least a third current conductor disposed in magnetic proximity to the core for producing a first level of residual magnetic flux in the core to provide for the formation of transient fluxes in the core, at least a fourth current conductor disposed in magnetic proximity to the core for producing a second level of residual magnetic flux in the core to inhibit the formation of transient fluxes in the core, the first core being formed to prevent the residual magnetic flux in the core from being permanently disturbed upon the introduction of the clock signals, a second saturable magnetic core, at least, first, second, third and fourth current conductors disposed in magnetic proximity to the core for functioning in a manner similar to that of the first, second, third and fourth conductors associated with the first core, the second core being formed to prevent the residual magnetic flux in the core from being permanently disturbed upon the introduction of clock signals, means for coupling the fourth current conductor associated with the first core and the third current conductor associated with the second core to produce the second flux level in the first core and simultaneously to produce the first flux level in the second core, and means for coupling the third current conductor associated with the first core and the fourth current conductor associated with the second core to produce the first flux level in the first core and to simultaneously produce the second flux level in the second core.

6. Apparatus as set forth in claim 5 in which at least one hole interrupts the uniformity of the flux travel path in each core to prevent the residual magnetic flux in the core from being permanently disturbed upon the introduction of the clock signals.

7. In combination, first and second saturable cores, means magnetically coupled to the first and second cores for receiving clock signals and for producing magnetic flux in the cores upon the occurrence of the clock signals, first and second output means respectively coupled magnetically to the first and second cores for the induction of output signals in accordance with the transient magnetic flux produced in the associated core by the clock signals, first and second control means for respectively providing magnetic flux of a first intensity in the first and second cores to obtain the production of transient magnetic flux in the cores upon the occurrence of the clock signals, third and fourth control means for respectively providing magnetic flux of a second intensity in the first and second cores to inhibit the production of transient magnetic flux in the cores upon the occurrence of the clock signals, means for introducing first signals to the first and fourth control means for the production of transient flux in the first core and the inhibition of transient flux in the second core upon the occurrence of the clock signals, and means for introducing second signals to the second and third control means for the production of transient flux in the second core and the inhibition of transient flux in the first core upon the occurrence of the clock signals.

8. In combination, a pair of saturable magnetic cores, a first pair of means each magnetically coupled to a different one of the cores for producing a magnetic flux of saturating intensity in its associated core, a second pair of means each magnetically coupled to a different one of the cores for producing a magnetic flux of neutral intensity in its associated core, a third pair of means each magnetically coupled to a different one of the cores for receiving clock signals and for producing transient changes in the magnetic flux only during the times of reduced flux intensity in the core, a fourth pair of means each magnetically coupled to the core for producing output signals in accordance with any transient changes in the flux in the core, means for introducing first signals to the first means coupled to the first core and to the second means coupled to the second core for the production of transient fluxes only in the second core uopn the occurrence of the clock signals, and means for introducing second signals to the first means coupled to the second core and to the second means coupled to the first core for the production of transient fluxes only in the first core upon the occurrence of the clock signals.

9. In combination, a pair of saturable magnetic cores, at least a pair of first current conductors each magnetically coupled to a different one of the cores to produce a saturating level of magnetic flux in the core, at least a pair of second current conductors each magnetically coupled to a different one of the cores to produce a relatively neutral level of magnetic flux in the core, at least a pair of third current conductors each magnetically coupled to a different one of the cores to receive recurrent clock signals and to produce transient flux in the core for a condition of neutral flux in the core upon the occurrence of each clock signal, and at least a pair of fourth current conductors each magnetically coupled to a different one of the cores for the induction of output signals upon the production of transient magnetic flux in the core, the first winding magnetically associated with each core being electrically coupled to the second winding magnetically associated with the other core to receive electrical signals for the production of a saturating level of magnetic flux in one of the cores at the same time as the production of a neutral level of magnetic flux in the other core.

10. In combination, a pair of saturable magnetic cores, there being at least first and second holes in each core to interrupt the magnetic continuity of the core, at least a first pair of windings each disposed on a different one of the cores at a position between the holes in the core to produce a saturating level of magnetic flux in the cores, at least a second pair of windings each threading the first hole in a different one of the cores to produce a neutral level of magnetic flux in the core, at least a third pair of windings each threading the second hole in a different one of the cores to receive clock signals and to produce transient magnetic flux in the core upon the occurrence of the clock signals only at the time that a neutral level of flux exists in the core, at least a fourth pair of windings each threading the second hole in a different one of the cores for the induction of output signals upon the production of transient flux in the cores, means for cross-connecting the first winding in each core with the second winding in the other core, and means for introducing signals to each pair of cross-connected windings to produce a saturating level of flux in one of the cores and a neutral level of flux in the other core.

11. In combination, a pair of saturable cores, there being at least a first hole in each core for interrupting the magnetic continuity of the core, at least a first pair of windings each being magnetically coupled to a different one of the cores at a position removed from the hole in the core for producing flux of a saturating intensity in the core, at least a second pair of windings each being magnetically coupled to a different one of the cores, means including the windings in the second pair for returning the flux in the cores to a relatively neutral level upon the application of signals having amplitudes greater than a minimum level, at least a third pair of windings each being magnetically coupled to a different one of the cores in threading relationship to the hole in the core for producing transient flux in the core upon the introduction of interrogating signals when the flux in the core is at a neutral intensity, at least a fourth pair of windings each being magnetically coupled to a different one of the cores in threading relationship to the hole in the core for the induction of output signals upon the production of transient magnetic flux, and means for introducing signals simultaneously to the first winding in one of the cores and the second winding in the other core for the production of transient flux in one of the cores at the same time as the inhibition of any production of transient flux in the other core.

12. Apparatus as set forth in claim 1 in which holes extend through the cores to interrupt the magnetic continuity of the cores for a retention in the cores of the magnetic information represented by the levels of magnetic flux in the cores even during the introduction of the clock signals.

No references cited.